Dec. 14, 1971          R. L. MOSER          3,626,781
                    GEAR SHIFTER MECHANISM
Filed March 13, 1970                    3 Sheets-Sheet 1
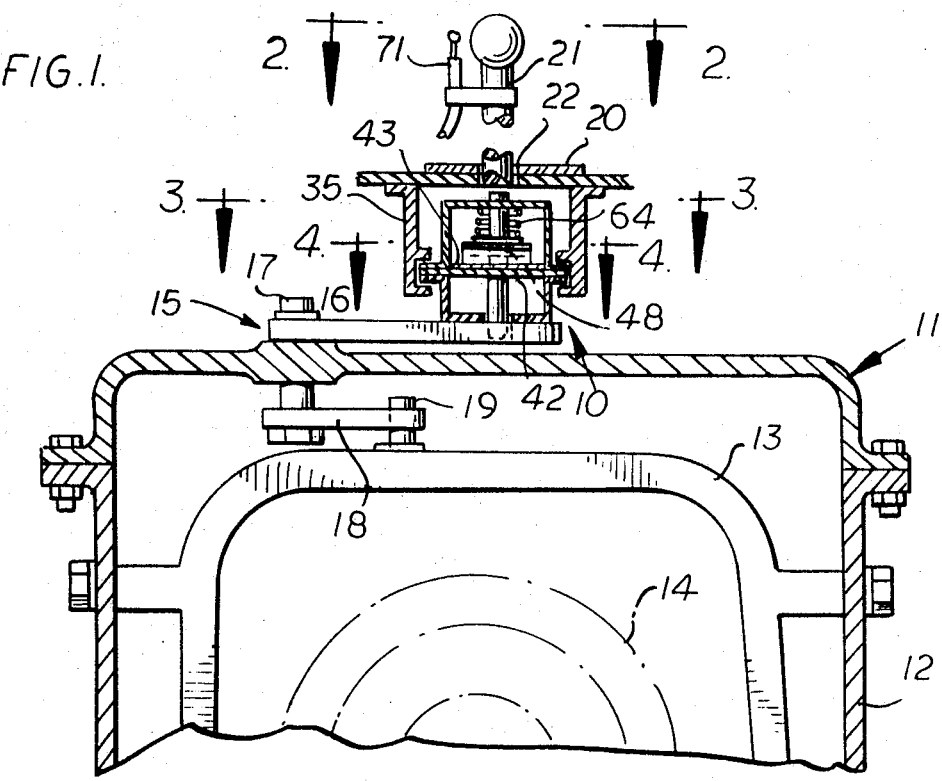
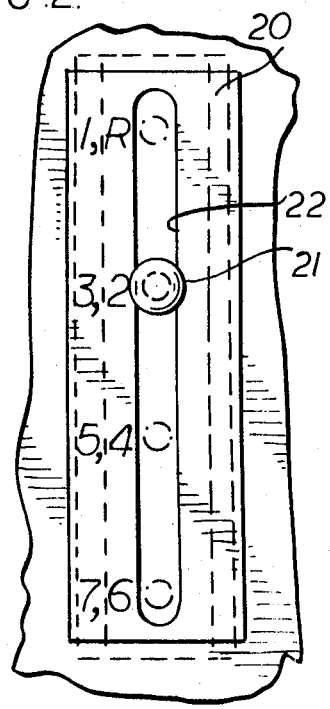
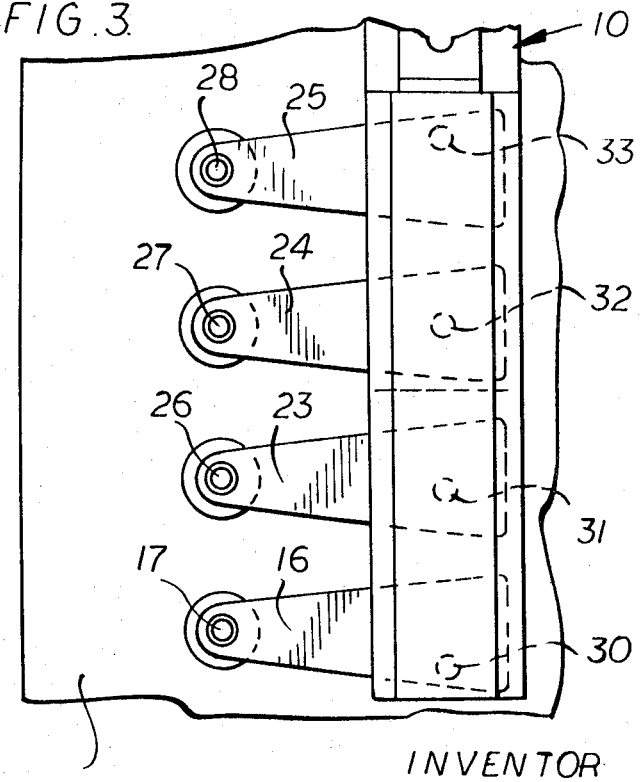
INVENTOR
ROBERT L. MOSER
Frederick J. Hawk
ATT'Y Dec. 14, 1971   R. L. MOSER   3,626,781
GEAR SHIFTER MECHANISM Filed March 13, 1970   3 Sheets-Sheet 2

INVENTOR
ROBERT L. MOSER
Frederick J. Hanke
ATT'Y

Dec. 14, 1971　　　　　R. L. MOSER　　　　　3,626,781
GEAR SHIFTER MECHANISM

Filed March 13, 1970　　　　　　　　　　　3 Sheets-Sheet 3

INVENTOR
ROBERT L. MOSER
ATTY

United States Patent Office
3,626,781
Patented Dec. 14, 1971

3,626,781
GEAR SHIFTER MECHANISM
Robert L. Moser, Columbia City, Ind., assignor to
International Harvester Company, Chicago, Ill.
Filed Mar. 13, 1970, Ser. No. 19,376
Int. Cl. G05g 5/00
U.S. Cl. 74—477                                      14 Claims

ABSTRACT OF THE DISCLOSURE

A sequential gear shift selector mechanism for a multi-speed transmission. The mechanism is formed principally of stamped metal parts rather than the precisely machined metal components of existing structures. The shifter includes a plurality of spring loaded pins, each of which is selectively and individually engageable with a respective one of the linkages for establishing one of a plurality of driving gear ratios upon movement of the shifter thereafter, and a cable actuated pin release ramp for raising simultaneously all of the pins while moving the shifter to effect engagement of another pin with its respective linkage.

---

This invention relates to vehicle transmissions and more particularly to a gear shift selector mechanism for use with a multi-speed transmission.

The gear shift and selector mechanisms for automotive transmissions currently in use generally include a shift lever movable in one or two dimensions, one or more shift rails adapted to engage the various gear ratios within the transmission, and a plurality of precision machined linkages interconnecting the shift lever with the shift rails to ensure the proper selection and operation of the desired gear ratio.

SUMMARY OF THE INVENTION

It is an object of the present invention to provide a simplified gear selector and shifter mechanism for a multi-speed automotive transmission that is formed principally of stamped metal parts and is operated by a single shift arm movable in one dimension.

It is another object to provide a gear shifter mechanism containing a plurality of spring loaded gear-shift engaging pins, longitudinally spaced and adapted to engage shift linkages mounted on an automotive transmission for establishing in sequence a plurality of driving gear ratios.

It is still another object to provide a shifter mechanism containing a plurality of spring loaded pins, and including a central wire cable actuated pin release ramp effective to disengage the pins from a linkage while shifting from one shift zone to another.

The shift linkages mounted on the transmission are longitudinally spaced so as to define a plurality of gear shift zones and are more widely spaced than the longitudinal spacing of the spring loaded pins so that not more than one linkage is engaged at one time. A shift arm attached to the shifter mechanism is moved longitudinally into the defined zones and upon engagement with the linkage is effective to establish two gear ratios by the back and forth movement of the shift arm.

Other objects and advantages of the invention will become more apparent when considered in connection with the following drawings.

BRIEF DESCRIPTION OF THE DRAWINGS

FIG. 1 is a sectional end view of a multi-speed transmission and of the shifter mechanism of the present invention;

FIG. 2 is a top view taken on line 2—2 of FIG. 1 of the cover plate for the shifter mechanism;

FIG. 3 is a top view taken on line 3—3 of FIG. 1 showing a plurality of swing links for the transmission;

DESCRIPTION OF THE PREFERRED EMBODIMENT

Figure 4:
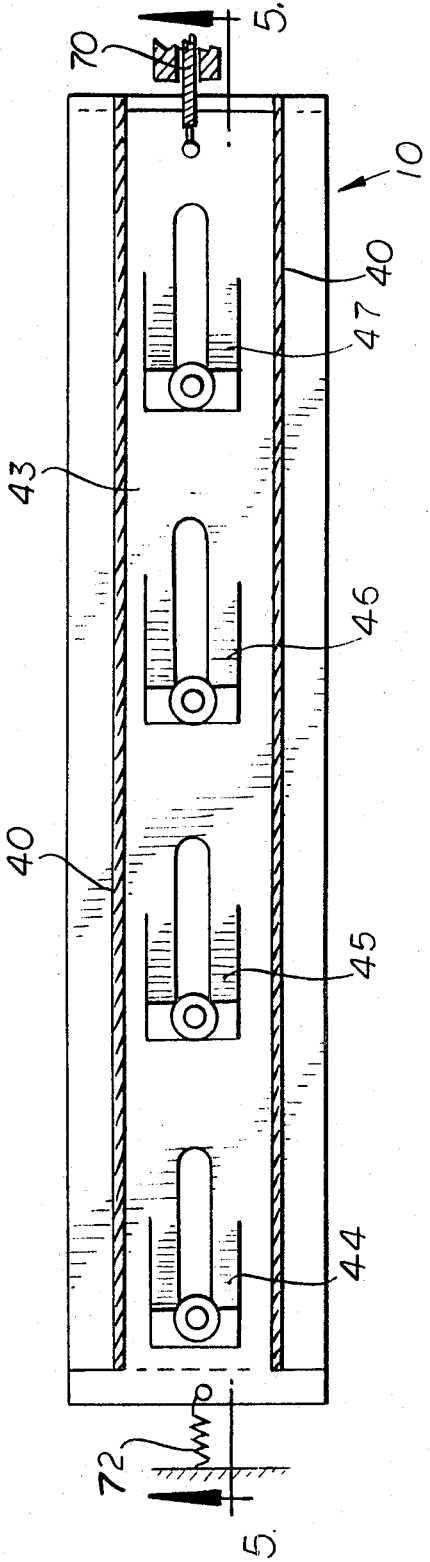
FIG. 4 is a top view of the interior of the shifter mechanism taken on line 4—4 of FIG. 1.

The gear shifter mechanism of the present invention is designated generally by the numeral 10 and is adapted to control the gear selection and shifting of a multi-speed transmission 11.

The transmission 11 includes a housing 12, a shift yoke 13 pivotally mounted within the housing 12, gearing 14 engaged by the arcuate movement of the yoke 13, and a linkage 15 operable by the shifter mechanism 10 to cause arcuate, back-and-forth movement of the yoke 13. The linkage 15 includes a swing link 16 engageable by the shifter 10, a shaft 17 pivotally mounted and extending through the housing 12 and to which the swing link 16 is attached, and a swing fork 18 also attached to the shaft 17 on the interior of the housing 12 and engaging a pin 19 mounted on the yoke 13.

When the shifter 10 engages the link 16, longitudinal movement of the shifter 10 produces arcuate movement of the swing link 16 which is transmitted through the shaft 17 to produce equal angular displacement of the swing fork 18. The fork 18 engaging the pin 19 produces arcuate movement of the yoke 13 in a different plane and causes the gearing 14 to be engaged for establishing a driving gear ratio. Forward movement of the yoke 13 establishes one ratio, and backward movement of the yoke 13 establishes another ratio.

Referring to FIGS. 2 and 3, there is shown an arrangement for a multi-speed ratio transmission having seven forward driving gear ratios and one reverse gear ratio. A cover plate or template 20 indicates four gear shift zones. One zone is for reverse and first speed forward; the second zone is for second and third forward speeds; the third for fourth and fifth forward speeds; and the fourth zone for sixth and seventh forward speeds.

A gear shift arm 21 is attached to the shifter mechanism 10 and is movable longitudinally through a slot 22 formed through the cover plate 20.

The transmission 11 includes swing links 23, 24 and 25 in addition to the link 16 already described. The links 23, 24, and 25 are pivotally mounted on shafts 26, 27, and 28, respectively, and all operate in the manner already described for the link 16. The links 16, 23, 24, and 25 are longitudinally spaced according to the four shift zones indicated on the cover plate 20, and are formed with holes 30, 31, 32, and 33, respectively. A gear-shift or shift zone of a link is defined as the space in which the link moves arcuately to effect maximum forward and backward movement of the yoke associated therewith. The links are relatively wide across in their lateral dimension and when the links are in their "neutral" positions or midway in their gear-shift zones or range of arcuate movements the holes are staggered or progressively more widely spaced. Only one hole is engageable by the shifter 10 at any one time. The manner in which this is accomplished will be pointed out hereinafter. Guide rails 35 and 36 support the mechanism 10 and constrain it to be moved longitudinally by the arm 21.

Figure 5:
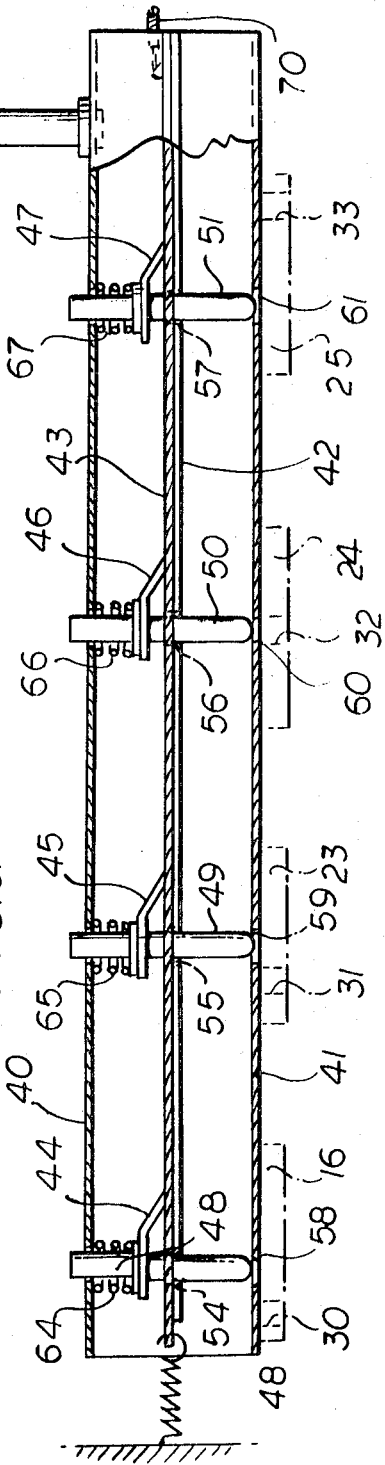
FIG. 5 is a sectional side view taken on line 5—5 of FIG. 4.
Figure 6:
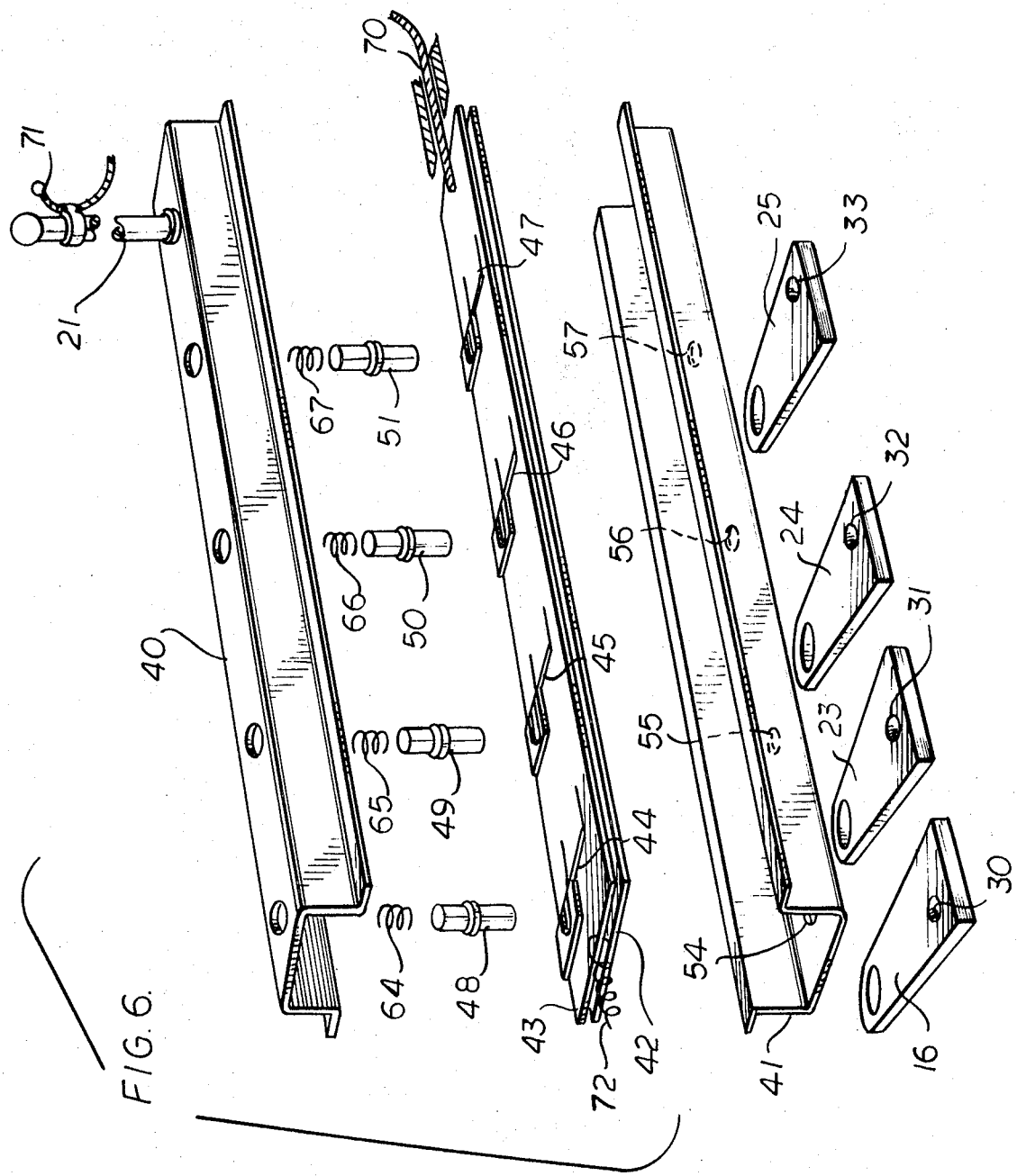
FIG. 6 is an exploded perspective view of the shifter mechanism.

Referring now to FIGS. 4, 5, and 6, the shifter mechanism 10 is seen to comprise an upper rectangular housing 40, a matching lower rectangular housing 41, a fixed central mounting plate 42, and a ramp strip 43 disposed to slide longitudinally along the central plate 42. The ramp strip 43 is formed with raised, slotted ramps 44, 45, 46, and 47 adapted to raise longitudinally spaced, slidably mounted flanged locking pins 48, 49, 50, and 51, respectively. The pins are retained by and slidably extend through holes 54, 55, 56, and 57 formed in the central mounting plate 42, and are adapted to project through holes 58, 59, 60, and 61, respectively, formed through the lower housing 41 for engaging the swing links 16, 23, 24, and 25, respectively. The locking pins 48, 49, 50, and 51 are evenly spaced with respect to each other. Consequently, since the holes are unevenly spaced as pointed out hereinbefore, it is not possible to have more than one pin in registration with its respective hole when the links are in their "neutral" positions at any one time. Compression springs 64, 65, 66, and 67 surround the pins 48, 49, 50, and 51, respectively, and tend to urge the pins through the respective holes in the bottom housing 41.

The ramp strip 43 is adapted to be moved longitudinally by a central cable wire 70 attached to one end of it and having a free end 71 mounted for manual operation on the shift arm 21. A spring 72 may be attached to the other end of the ramp strip 43 for automatically returning it to one position after the free end 71 of the wire 70 has been released.

When the ramp strip 43 is moved so as to permit the biasing action of the compression springs 64, 65, 66, and 67 to lower pins 48–51, their free ends come in sliding contact with the swing links 16, 23, 24, and 25. However, if the shift arm 21 is moved to the "1,R" position before the free end 71 of the wire 70 is released, the pin 48 which is then in vertical registration with the hole 30 enters the hole 30 upon release of the wire 70. Once this pin has been engaged, subsequent back-and-forth movement of the arm 21 engages either the first speed drive condition or the reverse drive depending on the direction of movement of the arm 21. The extent of travel of the shift arm 21 to accomplish the shift is less than is required to move the arm 21 to the next shift zone so that the pin 49 cannot engage the hole 31.

A shift to the next higher forward speed gear ratio is accomplished by first pulling on the end 71 of the cable wire 70. This causes the ramp 43 to move to the right as shown raising all of the pins 48–51 and disengaging the pin 48 from the hole 30. The shift arm 21 is then moved to the "3,2" shift zone and the end 71 of the wire 70 is released allowing the ramp strip 43 to return to its pin-lowering position and permitting the pin 49 which is then in vertical registration with the hole to engage the hole 31. Subsequent back-and-forth movement of the shift arm 21 in this zone engages the second speed forward gear ratio and third speed forward gear ratio. Again, the extent of travel of the arm 21 in this zone is less than is required to permit the engagement of the pin 48 with the hole 30 or the pin 50 with the hole 32.

Up-shifts to the higher speed ratios is accomplished in the same way by first pulling the ramp strip 43 to the pin-raising position and moving the shift arm 21 to the "5,4" zone and subsequently to the "7,6" zone.

Nearly all of the parts making up the shifter 10, that is, the upper and lower housings 40 and 41, the central strip 42, and the ramp strip 43, may all be formed from stamped sheet metal and assembled into an integral unit. The shifter mechanism 10 can thus replace the plurality of precision machined parts currently employed for this purposes. The shifter 10 provides a mode of operation that is both simpler and less expensive than the shift rails and linkages currently employed in the art.

While a preferred embodiment of the invention has been specifically disclosed, it is to be understood that the invention is not limited thereto as other variations will be apparent to those skilled in the art and the invention is to be given its fullest possible interpretation within the terms of the following claims.

What is claimed is:

1. A gear shift selector mechanism for an automotive transmission having gearing for establishing multiple driving speed ratios and a plurality of longitudinally spaced actuating linkages for engaging the gearing comprising:
   an elongated housing disposed adjacent said actuating linkages, said housing being longitudinally movable to a plurality of longitudinally spaced gear shift zones;
   a plurality of longitudinally spaced pins slidably supported by said housing, each of said pins being operatively engageable with a respective one of said actuating linkages only when said housing is in a particular one of said gear shift zones;
   biasing means resiliently urging each of said pins toward its respective actuating linkage; and
   a ramp strip means disposed within said housing, said ramp strip being longitudinally movable with respect to said housing to effect simultaneous disengagement of all of said pins from said actuating linkages against the biasing action of said biasing means and thereby permit movement of said housing from one gear shift zone to another.

2. The gear shift mechanism of claim 1 including a manually operable shift arm fixedly attached to said housing and movable in a single longitudinal plane containing said pins to effect movement of said housing to the gear shift zones and engagement of the gearing.

3. The gear shift mechanism of claim 2 including a manually operated central wire cable attached to said ramp strip means for actuating the latter to effect simultaneous disengagement of all of said pins from said actuating linkages against the biasing action of said biasing means.

4. The gear shift mechanism of claim 3 wherein the free end of said central wire cable is carried by and is disposed adjacent one end of said shift arms.

5. The gear shift mechanism of claim 2 including a template formed with longitudinal slot means for constraining said arm to movement in said single longitudinal plane containing said pins and indexed to define said multiple gear shifting zones.

6. A gear shift mechanism for an automotive transmission having a plurality of gearing for establishing multiple driving speed ratios comprising:
   a plurality of longitudinally disposed, arcuately movable swing links mounted on the transmission, each of said swing links being operatively connected to a respective one of said gearing whereby arcuate movement of the swing link effects actuation of the gearing; and
   a movable composite shifter mechanism including a manually operable shift arm constrained to move in a single longitudinally extending, substantially vertical plane a plurality of pin means, each of said pin means being selectively engageable with a respective one of said links whereby movement of said shift arm in said single plane, once a pin means is selectively engaged with its respective swing link, effects arcuate movement of said one of said links.

7. The gear shift mechanism of claim 6 wherein the space in which each of said longitudinally disposed swing links is capable of moving arcuately defines a particular gear-shift zone and movement of an engaged link in opposite directions in its gear-shift zone from a "neutral" position is effective to establish two driving gear ratios.

8. A composite gear shifter mechanism for a multispeed automotive transmission having a plurality of longitudinally disposed actuating linkages for engaging the gearing within the transmission comprising:
   a stamped sheet metal, generally elongated housing;
   a plurality of longitudinally spaced spring-loaded pins mounted within said housing, said pins being biased to project through openings formed in said housing, each of said pins being operatively engageable with a respective one of said actuating linkages when projecting from said housing; and a stamped sheet metal, longitudinally movable ramp strip means contacting said pins and effective when moved from a first position to a second position to retract all of said pins simultaneously so that no one of said pins is capable of operatively engaging its respective linkage.

9. The gear shifter mechanism of claim 10 including means for slidably supporting said pins including a stamped sheet metal mounting strip rigidly mounted within said housing, said mounting strip having a plurality of holes formed therethrough, each of said holes being in alignment with a respective one of said holes formed in said housing.

10. The gear shifter mechanism of claim 9 wherein said ramp strip means is slidably supported upon and movable longitudinally with respect to said mounting strip.

11. The gear shifter mechanism of claim 8 including a manually operable shift arm having one end operatively connected to said housing.

12. The gear shifter mechanism of claim 11 including manually operable, flexible cable means attached to said ramp strip and having a free end mounted on and adjacent to the free end of said shift arm.

13. A gear shift mechanism for an automotive transmission having a plurality of gearing for establishing multiple driving speed ratios comprising:

a plurality of longitudinally disposed, arcuately movble swing links mounted on the transmission, each of said swing links being operatively connected to a respective one of said gearing whereby arcuate movement of the swing link effects actuation of the gearing, the space in which each of said longitudinally disposed swing links in capable of moving arcuately defining a particular gear-shift zone and movement of an engaged link in opposite directions in its gear-shift zone from a "neutral" position is effective to establish two driving gear ratios, each of said links having a hole formed therethrough, the longitudinal spacing between each pair of adjacent holes when said links are in their "neutral" position being different than the longitudinal spacing between the other pairs of adjacent holes; and a movable composite shifter mechanism including a plurality of pin means, said pin means being longitudinally spaced along the longitudinal axis of said shifter mechanism, the longitudinal spacing between each pair of adjacent pin means being equal so that not more than one link is engaged at any one time by said pin means, each of said pin means being selectively receivable within a hole of a respective one of said links whereby movement of the shifter mechanism, once a pin means is selectively received within its respective swing link hole, effects arcuate movement of said one of said links.

14. The gear shift mechanism of claim 13 including a longitudinally movable ramp strip means mounted within said shifter mechanism and effective when actuated to disengage all of said pin means simultaneously and to maintain said pin means withdrawn from said link holes.

References Cited

UNITED STATES PATENTS

| | | | |
|---|---|---|---|
| 3,122,941 | 3/1964 | Goldsmith | 74—473 |
| 2,097,566 | 11/1937 | Hummer | 74—473 |

MILTON KAUFMAN, Primary Examiner